United States Patent
Finkelstein et al.

(10) Patent No.: US 7,945,142 B2
(45) Date of Patent: May 17, 2011

(54) AUDIO/VISUAL EDITING TOOL

(75) Inventors: Charles A. Finkelstein, Woodinville, WA (US); Ian C. Mercer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1224 days.

(21) Appl. No.: 11/424,509

(22) Filed: Jun. 15, 2006

(65) Prior Publication Data

US 2007/0292106 A1     Dec. 20, 2007

(51) Int. Cl.
  *H04N 5/93* (2006.01)
(52) U.S. Cl. ........................................ 386/285
(58) Field of Classification Search .................. 386/46, 386/52, 54, 282, 287
  See application file for complete search history.

(56) References Cited

U.S. PATENT DOCUMENTS

| | | | |
|---|---|---|---|
| 5,353,391 A | 10/1994 | Cohen et al. | |
| 5,467,288 A * | 11/1995 | Fasciano et al. | 715/716 |
| 5,513,306 A | 4/1996 | Mills et al. | |
| 5,706,417 A | 1/1998 | Adelson | |
| 5,729,252 A | 3/1998 | Fraser | |
| 5,832,495 A | 11/1998 | Gustman | |
| 5,929,867 A | 7/1999 | Herbstman et al. | |
| 5,990,980 A | 11/1999 | Golin | |
| 6,028,603 A | 2/2000 | Wang et al. | |
| 6,081,299 A | 6/2000 | Kesselring | |
| 6,154,601 A | 11/2000 | Yaegashi et al. | |
| 6,173,317 B1 | 1/2001 | Chaddha et al. | |
| 6,188,831 B1 | 2/2001 | Ichimura | |
| 6,195,088 B1 | 2/2001 | Signes | |
| 6,204,840 B1 | 3/2001 | Petelycky et al. | |
| 6,230,172 B1 | 5/2001 | Purnaveja et al. | |
| 6,243,725 B1 | 6/2001 | Hempleman et al. | |
| 6,317,795 B1 | 11/2001 | Malkin et al. | |
| 6,351,765 B1 | 2/2002 | Pietropaolo et al. | |
| 6,400,996 B1 | 6/2002 | Hoffberg et al. | |
| 6,424,789 B1 | 7/2002 | Abdel-Mottaleb | |
| 6,476,826 B1 | 11/2002 | Plotkin et al. | |
| 6,487,360 B1 | 11/2002 | Sumiyoshi et al. | |
| 6,546,188 B1 | 4/2003 | Ishii et al. | |
| 6,549,922 B1 | 4/2003 | Srivastava et al. | |
| 6,577,807 B1 | 6/2003 | Yaegashi et al. | |
| 6,597,859 B1 | 7/2003 | Leinhart et al. | |

(Continued)

FOREIGN PATENT DOCUMENTS

EP    0 564 247 A1    10/1993

(Continued)

OTHER PUBLICATIONS

Wikipedia, "Windows Movie Maker", http://en.wikipedia.org/wiki/Windows_Movie_Maker, saved printout pp. 1-18 on Feb. 28, 2008.

(Continued)

*Primary Examiner* — Huy T Nguyen
(74) *Attorney, Agent, or Firm* — Senniger Powers LLP

(57) ABSTRACT

A method for analyzing data sequences, such as video and audio segments, and extracting metadata from the data sequences for providing information related to events of the data sequences. The metadata extracted is used for making editing decisions, such as for an audio-visual production comprised of a collection of video and audio segments. The metadata identifies events of importance in the video and audio segments, which may then be applied to the editing process. A user interface including the extracted metadata in a timeline format facilitates editing the audio-visual production.

9 Claims, 7 Drawing Sheets

U.S. PATENT DOCUMENTS

| | | |
|---|---|---|
| 6,606,388 B1 | 8/2003 | Townsend et al. |
| 6,606,409 B2 | 8/2003 | Warnick et al. |
| 6,678,332 B1 | 1/2004 | Gardere et al. |
| 6,721,361 B1 | 4/2004 | Covell et al. |
| 6,721,781 B1 | 4/2004 | Bates et al. |
| 6,728,729 B1 | 4/2004 | Jawa et al. |
| 6,760,721 B1 | 7/2004 | Chasen et al. |
| 6,807,306 B1 | 10/2004 | Girgensohn et al. |
| 6,813,313 B2 | 11/2004 | Xu et al. |
| 6,877,134 B1 | 4/2005 | Fuller et al. |
| 6,898,799 B1 | 5/2005 | Jarman |
| 6,912,693 B2 | 6/2005 | Camara et al. |
| 6,928,613 B1 | 8/2005 | Ishii et al. |
| 6,961,549 B2 | 11/2005 | Mori |
| 7,016,540 B1 | 3/2006 | Gong et al. |
| 7,027,509 B2 | 4/2006 | Jun et al. |
| 7,099,946 B2 | 8/2006 | Lennon et al. |
| 7,203,380 B2 | 4/2007 | Chiu et al. |
| 7,222,300 B2 | 5/2007 | Toyama et al. |
| 7,251,413 B2 | 7/2007 | Dow et al. |
| 7,334,191 B1 | 2/2008 | Sivan et al. |
| 7,359,440 B2 | 4/2008 | Zhang et al. |
| 7,398,004 B1 | 7/2008 | Maffezzoni et al. |
| 7,444,062 B2 | 10/2008 | Matsumoto |
| 2002/0038456 A1 | 3/2002 | Hansen et al. |
| 2002/0054742 A1 | 5/2002 | Shimotakahara et al. |
| 2002/0112226 A1 | 8/2002 | Brodersen et al. |
| 2002/0126552 A1 | 9/2002 | Jeong |
| 2002/0146235 A1 | 10/2002 | Watanabe et al. |
| 2002/0147728 A1 | 10/2002 | Goodman et al. |
| 2002/0184180 A1 | 12/2002 | Debique et al. |
| 2002/0193895 A1 | 12/2002 | Qian et al. |
| 2003/0009469 A1 | 1/2003 | Platt et al. |
| 2003/0032033 A1 | 2/2003 | Anglin et al. |
| 2003/0052910 A1 | 3/2003 | Shiiyama |
| 2003/0090506 A1 | 5/2003 | Moore et al. |
| 2003/0142955 A1 | 7/2003 | Hashizume et al. |
| 2003/0146915 A1 | 8/2003 | Brook et al. |
| 2003/0192044 A1 | 10/2003 | Huntsman |
| 2003/0192049 A1 | 10/2003 | Schneider et al. |
| 2003/0225777 A1 | 12/2003 | Marsh |
| 2003/0227493 A1 | 12/2003 | Yokomizo |
| 2003/0234805 A1 | 12/2003 | Toyama et al. |
| 2003/0236832 A1 | 12/2003 | McIntyre et al. |
| 2003/0237091 A1 | 12/2003 | Toyama et al. |
| 2004/0049419 A1 | 3/2004 | Knight |
| 2004/0061791 A1 | 4/2004 | Terada |
| 2004/0064500 A1 | 4/2004 | Kolar et al. |
| 2004/0070678 A1 | 4/2004 | Toyama et al. |
| 2004/0085341 A1 | 5/2004 | Hua et al. |
| 2004/0095374 A1 | 5/2004 | Jojic et al. |
| 2004/0128308 A1 | 7/2004 | Obrador |
| 2004/0143590 A1 | 7/2004 | Wong et al. |
| 2004/0143598 A1 | 7/2004 | Drucker et al. |
| 2004/0143604 A1 | 7/2004 | Glenner et al. |
| 2004/0177319 A1 | 9/2004 | Horn |
| 2005/0005308 A1 | 1/2005 | Logan et al. |
| 2005/0010953 A1 | 1/2005 | Carney et al. |
| 2005/0033758 A1 | 2/2005 | Baxter |
| 2005/0053356 A1 | 3/2005 | Mate et al. |
| 2005/0071774 A1 | 3/2005 | Lipsky et al. |
| 2005/0097120 A1 | 5/2005 | Cooper et al. |
| 2005/0114357 A1 | 5/2005 | Chengalvarayan et al. |
| 2005/0216454 A1 | 9/2005 | Diab et al. |
| 2005/0229225 A1 | 10/2005 | Klausberger et al. |
| 2005/0249080 A1 | 11/2005 | Foote et al. |
| 2005/0257151 A1 | 11/2005 | Wu |
| 2005/0281535 A1 | 12/2005 | Fu et al. |
| 2006/0059426 A1 | 3/2006 | Ogikubo |
| 2006/0288288 A1 | 12/2006 | Girgensohn et al. |
| 2007/0009231 A1 | 1/2007 | Shinkai et al. |
| 2007/0044010 A1 | 2/2007 | Sull et al. |
| 2007/0074115 A1 | 3/2007 | Patten et al. |
| 2007/0168543 A1 | 7/2007 | Krikorian et al. |
| 2007/0230807 A1 | 10/2007 | Shiiyama |
| 2007/0282908 A1 | 12/2007 | Van der Meulen |
| 2008/0034325 A1 | 2/2008 | Ording |

FOREIGN PATENT DOCUMENTS

| | | |
|---|---|---|
| EP | 1100021 A2 | 5/2001 |
| WO | 01/15169 A1 | 3/2001 |

OTHER PUBLICATIONS

Microsoft, "Adding Video Effects to Your Movies with Windows Movie Maker 2", Nov. 13, 2003, http://www.microsoft.com/windowsxp/using/moviemaker/learnmore/addingeffects.mspx, printout pp. 1-3.

Chen, et al., Metadata for Mixed-Media Access, SIGMOD Record, Dec. 1994, pp. 64-71, vol. 23, No. 4, Xerox Palo Alto Research Center, Palo Alto, California.

Ding, et al., Multimodal Surrogates for Video Browsing, http://www.clis.umd.edu/faculty/soergel/soergeldI99wdgmds.pdf, no date, 9 pp.

Microsoft Windows XP, AutoMovie Makes it Easy, http://www.microsoft.com/windowsxp/using/moviemaker/learnmore/automovie.mspx, Jan. 7, 2003, 3 pp. Microsoft Corporation, United States.

Smith, et al., Video Skimming for Quick Browsing based on Audio and Image Characterization, http://www.ri.cmu.edu/pubs/pub_2545.html, School of Computer Science, Carnegie Mellon University, Jul. 30, 1995, 24 pp., Pittsburgh, PA.

Srinivasan, et al., "What is in that video anyway?": In Search of Better Browsing, http://ieeexplore.ieee.org/xpl/abs_free.jsp?arNumber=779235, 1999, pp. 388-393, IBM Almaden Research Center, San Jose, CA.

\* cited by examiner

AUDIO/VISUAL EDITING TOOL

BACKGROUND

Many people are accustomed to consuming sophisticated, well edited media, as seen on television, in movies, and in other professionally produced media. Because of these heightened expectations, non-expert video editors are likely to fail at producing video productions that fulfill their personal expectations, or the expectations of their highly-conditioned audience. Non-expert users of non-linear video editing (e.g., digital video editing) systems typically cannot create attractive looking and sounding videos. Unlike professional video editors who have knowledge and experience in making effective editing decisions, non-expert users have little to no experience, and would therefore benefit greatly from a coach. Such non-expert video editors may need editing assistance to create higher-quality products. For example, if a non-expert user had one-on-one professional advice on how to make a high impact, upbeat video, he would likely receive particular editing suggestions (e.g., use jump-cuts in places where music beats and loud audio peaks, like explosions, are located). With this advice, such a non-expert user could cut to dramatic video image changes at particular points corresponding to the audio. Unfortunately, many users are unable to hire an expert video editing coach, and are therefore unable to apply this advice or any other techniques applied by expert editors.

Conventional media editing tools (e.g., video editing software) provide users with the ability to capture, edit, import, and modify both visual and audio media for the development of audio/visual works. For example, a user can create an audio/visual work with a media editing tool (e.g., Microsoft® Windows Movie Maker Version 2.1) and the media editing tool can provide the user with several functions, including trimming, splicing, and cropping video, merging image, audio, and video media, adding transitions and effects between constituent parts, and overlaying additional audio, to name a few. In the hands of a skilled user, such a conventional system can provide a means for merging several different types of media together into a unified work, different than all of its constituent portions. Unfortunately, such conventional media editing tools do not provide the type of advanced guidance required to substantially improve editing for the novice user. Without assistance from a human expert, most users are relegated to creating basic video productions without the tools and expertise available to a professional editor. A way to provide some of these tools and expertise to novice users based upon their specific media content would be useful. Moreover, a way to automatically edit and produce an audio/visual work or semi-automatically produce one by allowing modification of the results yielded by the automatic process and then producing (rendering) the audio/visual work would also be useful, such as to a novice user.

Moreover, even for the expert editor who understands how to effectively manually edit media, additional tools identifying critical events in the media being edited can facilitate more efficient editing. In other words, automatically identifying potential edit events to the skilled editor can facilitate more efficient and effective editing because effort can be applied to the creative aspects of the editing process, rather than to the identification of potential editing events. Thus, a way to provide tools to an experienced editor in identifying potential editing events would be useful.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, aspects of the invention provide for analyzing data sequences and extracting metadata from the data sequences to provide information related to events of the data sequences. These events provide specific editing guidance to a user. By analyzing multiple data sequences according to characteristics to extract metadata from each sequence, aspects of the invention permit the dissemination of information regarding key events and features of the data sequences for use by a user in editing the sequences. Moreover, determining which of such metadata occur at substantially the same time and associating the metadata with a timeline provide information to users related to the coordination of editing events from different data sequences, thereby facilitating editing by a user.

BRIEF DESCRIPTION OF THE DRAWINGS

Corresponding reference characters indicate corresponding parts throughout the drawings.

DETAILED DESCRIPTION

Aggregate Timeline Overview

Figure 1:
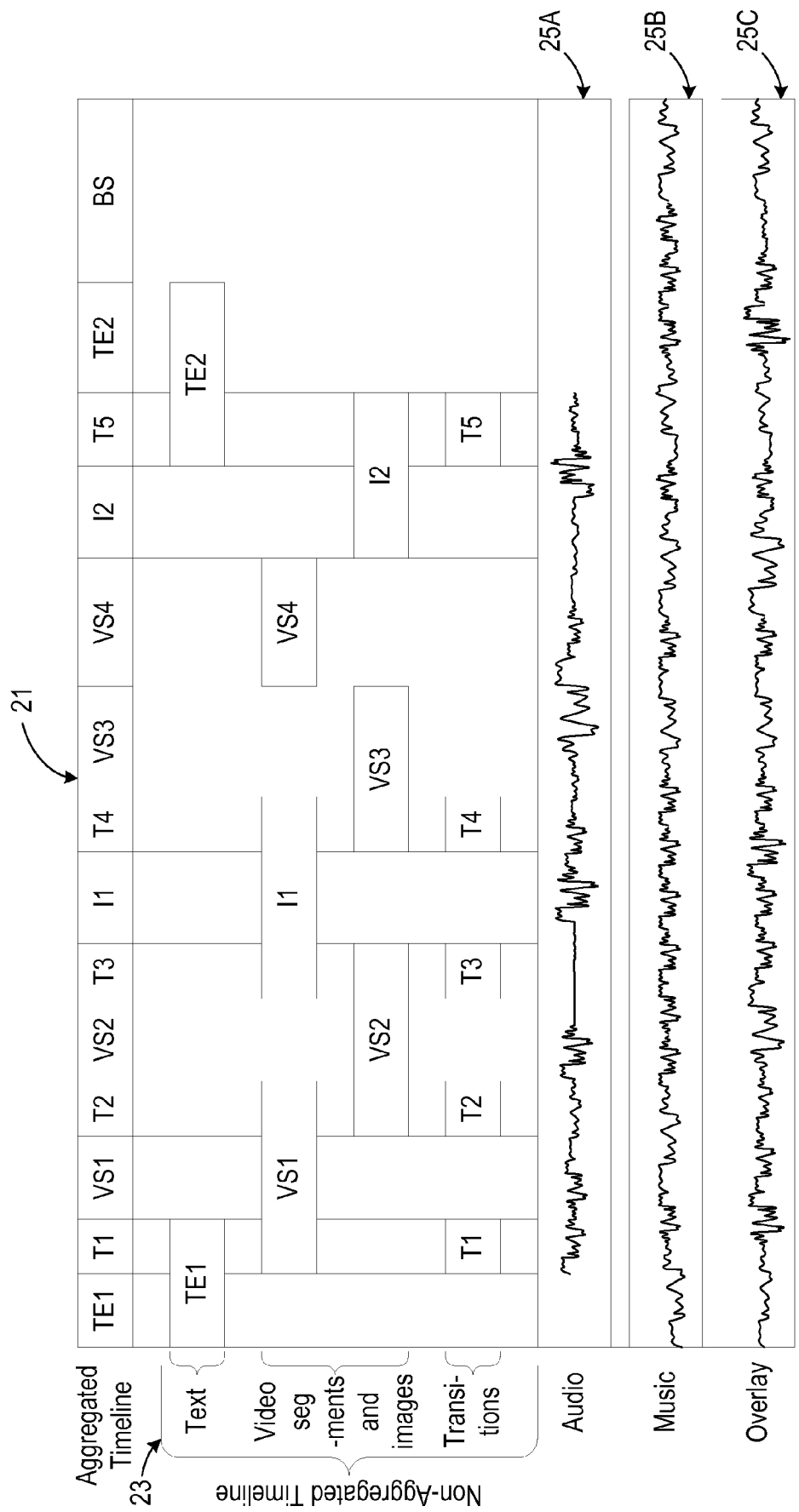
FIG. 1 is a diagram of an aggregate timeline and its constituent parts of one embodiment of the invention.

Referring now to FIG. 1, a diagram of an aggregate timeline, generally indicated 21, and its constituent parts of one embodiment of the invention is shown. The constituent parts of the aggregate timeline 21 include several objects commonly associated with media editing. Those objects may include but are not limited to textual messages TE1, TE2 (e.g., titles, credits, presentation information, etc.), video segments VS1, VS2, VS3, VS4 (e.g., video clips, animations, etc.), digital images I1, I2 (e.g., digital photographs, documents, screenshots, and computer-generated images, etc.), and transitions, or effects, between other objects T1, T2, T3, T4, and T5. The aggregate timeline 21 further includes blank space BS as an object for holding timeline space open, without any objects. Advantageously, media editing software embodying aspects of the invention analyze multiple data sequences according to characteristics to extract metadata from each sequence. This metadata might include a transition to a new video scene, a new face entering a video scene, or a music beat in an audio sequence, among others, as described below. This permits the dissemination of metadata information regarding events and features of the data sequences for use in editing the sequences. Providing such metadata to a user will assist in the editing process, as the use of such metadata can offer convenient and effective editing choices (e.g., for a novice use). Moreover, determining which of such metadata occur at substantially the same time and associating the metadata with a timeline provide information related to the coordination of editing events from different data sequences, which is also helpful when editing.

The diagram also illustrates a non-aggregated timeline, generally indicated 23, which depicts each of the objects separately. Such a timeline is particularly useful for understanding the details of how a media production involving multiple media objects and transitions may be constructed. For example, the first textual message TE1 extends from the beginning, or left edge, of the timeline until the end, or right edge, of the first transition T1. Similarly, the first video segment VS1 extends from the beginning, or left edge, of the first transition T1 until the end, or right edge of the second transition T2. As would be readily understood by one skilled in the art, during the first transition, the viewer of the media would begin by seeing primarily the first textual message. As time passed during the first transition T1, more of the first video segment VS1 would be visible while less of the first textual message TE1 would be visible. The remaining timeline objects function similarly. As would be readily understood by one skilled in the art, any number of different types of objects can be included in any arrangement without departing from the scope of the embodiments of the present invention. Moreover, in the non-aggregated timeline 23 of FIG. 1, each of the video segments VS1, VS2, VS3, VS4 and digital images I1, I2 is depicted as staggered from adjacent video segments and digital images to facilitate viewing of the entire scope of the video segment or image, without overlap.

In addition to the visual aspects of the aggregated timeline 21 and the non-aggregated timeline 23, additional information is included in the form of aural tracks 25, three of which are depicted in FIG. 1 for purposes of illustration. Audio track 25A depicted in the diagram is the aggregation of the audio associated with each of the video segments VS1, VS2, VS3, VS4 and digital images I1, I2, described above. In this exemplary diagram, the audio track 25A depicts the intensity of the aggregated audio over time, such that the intensity of the audio—and indirectly the activities of the video segments VS1, VS2, VS3, VS4 and the digital images I1, I2—can be understood as a function of time. Audio track 25B (e.g., a musical overlay) included in the diagram depicts the intensity of music currently present in the timeline 23. As with the audio track 25A, the music track 25B depicts the intensity of the music track or tracks over time, thereby providing an indication of the nature of the music. Overlay track 25C depicted in the diagram depicts items that may be composited, or added, onto the audio/visual work over time. The duration, blending, and intensity of each is specified over time. Examples of these items are text that may be used for titles and captions, other images, animations, or video. Other audio characteristics, other than audio intensity, can also be depicted on the aural tracks 25, without departing from the scope of the embodiments of the present invention. In addition, other aural tracks 25 can be included without departing from the scope of the embodiments of the present invention.

In the example shown in FIG. 1, both video segments VS and still digital images I are included. It should be understood that the timeline may contain any number and typed of items. For example, the timeline may include at least one of video, video with associated audio, images, audio, music, text, overlay text, images, animations, and other text, without departing from the scope of the present invention. In another example, the timeline can contain only video segments VS, or only digital images I, without departing from the scope of the embodiments of the present invention. Moreover, as used herein the term digital images can include digital photographs, but can also include other digital items, including documents, scanned images, and computer-generated images, to name a few.

Creating Aggregate Timeline and Events

Figure 2:
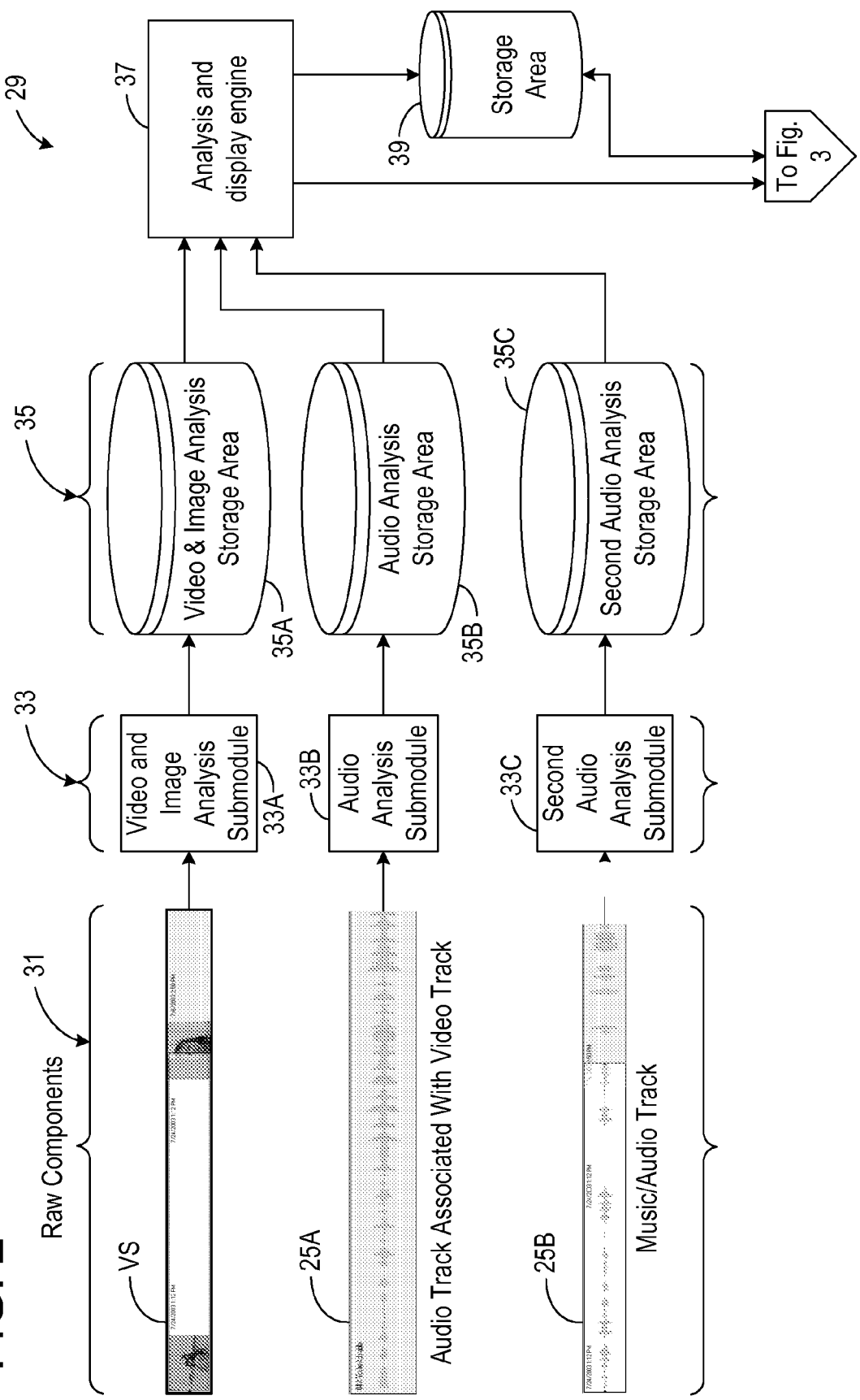
FIG. 2 is a flow diagram of a method of one embodiment of the invention.
Figure 3:
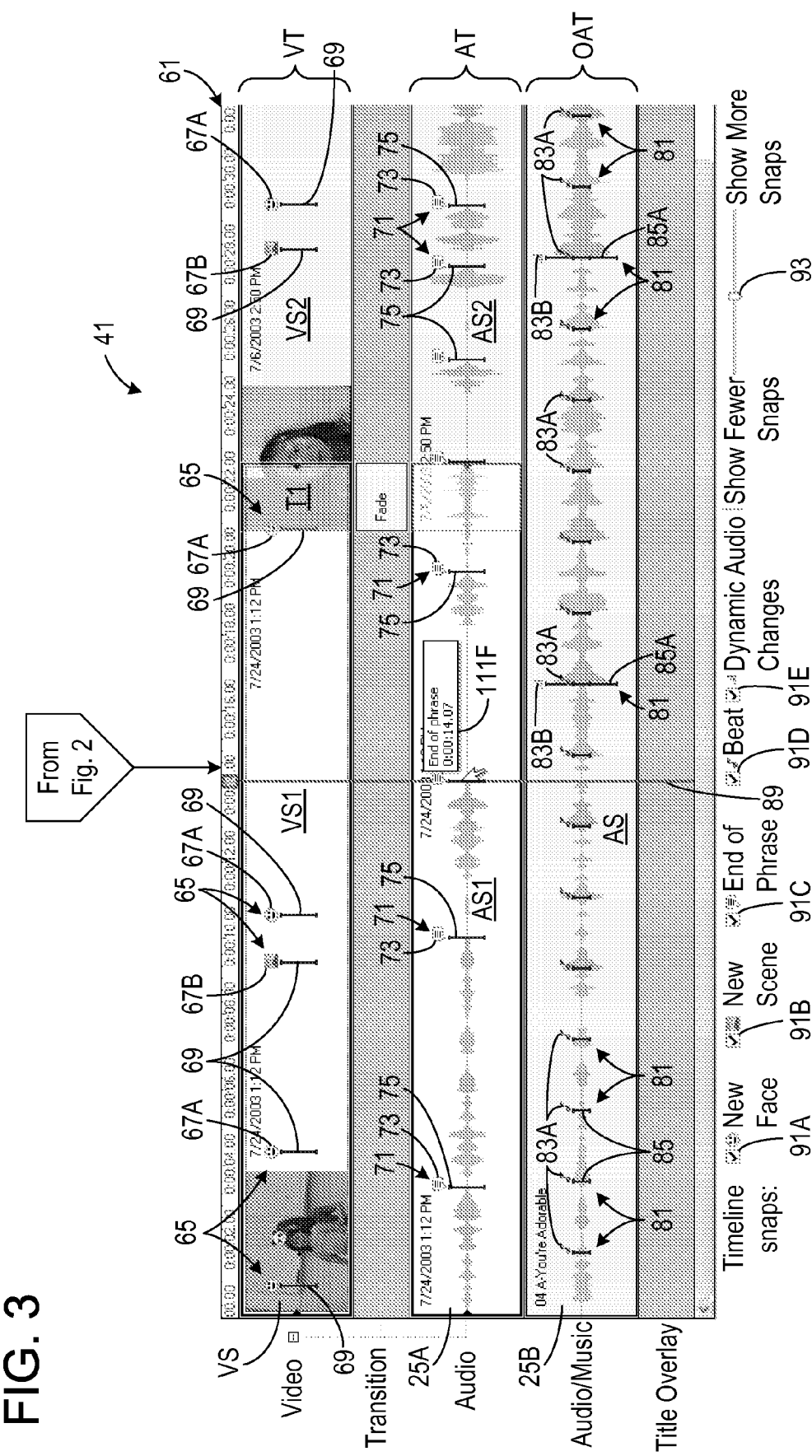
FIG. 3 is an extension of the flow diagram of FIG. 2.

Referring now to FIGS. 2 and 3, a system flow diagram, generally indicated 29, depicts one embodied method of the present invention. The system flow begins with raw components, generally indicated 31, as described generally above. In this embodiment, the raw components include a video segment VS, an audio track 25A associated with the video segment, and a music track 25B. As would be readily understood by one skilled in the art, each of these raw components 31 can be referred to more generally as data sequences, such as a visual data sequence VS, an audio data sequence 25A, and a second, or overlay, audio data sequence 25B.

These raw components 31 are each sent to an analysis module, generally indicated 33, which analyzes the underlying data sequences of the raw components. In particular, the video segment VS is sent to a video and image analysis submodule 33A, the audio track 25A is sent to an audio analysis submodule 33B, and the music track 25B is sent to a second audio analysis submodule 33C. As will be discussed in greater detail below, the analysis module 33 analyzes the underlying data sequences VS, 25A, 25B and extracts metadata related to the data sequences. This metadata can be useful to an editor, for example a novice editor, in selecting appropriate locations for particular editing decisions, as discussed below. In one embodiment, the audio analysis submodule 33B is a speech analysis submodule. In another embodiment, the second audio analysis submodule 33C is a music analysis submodule, and more particularly a music beat and audio peak analysis submodule. It should also be noted that other submodules may be added to perform additional analyses without departing from the scope of the present invention.

After analysis by each submodule 33A, 33B, 33C, the extracted metadata from each component 31 is collected in a storage area, generally indicated 35. In particular, a video and image analysis storage area 35A receives the extracted metadata from the video and image analysis submodule 33A, an audio analysis storage area 35B receives the extracted metadata from the audio analysis submodule 33B, and a second audio analysis storage area 35C receives the extracted metadata from the second audio analysis submodule 33C. Although the storage areas 35A, 35B, and 35C are depicted as separate in FIG. 2, it should be understood by one skilled in the art that two or more of those storage areas can be combined without departing from the scope of the embodiments of the present invention.

After collecting and storing the extracted metadata in the storage areas 35A, 35B, and 35C, an analysis engine 37 receives the stored metadata and analyzes the metadata. As discussed below in greater detail, the analysis engine 37 analyzes the content of the data sequences VS, 25A, 25B and makes meaningful editing suggestions, in the form of events, based upon the actual content of the data sequence (e.g., scene changes, music beats, audio peaks, spaces between spoken words, etc.). In one alternative embodiment, the analysis engine 37 determines the intersection of metadata events occurring at substantially the same time within different raw components 31 and associates such metadata with a common timeline associated with the raw components. The results of this analysis are stored in storage area 39.

The analysis engine 37 is also responsible for displaying the metadata and the results of its analysis, such as in depicted in the user interface, generally indicated 41, of FIG. 3. The editing suggestions noted above are displayed in the timeline of the user interface 41 as "snap-to-points" (also known as "sticky points") corresponding to the events. Moreover, the analysis engine 37 is adapted to receive control parameters from the user via the user interface 41 of FIG. 3. Such control parameters can also be stored in the storage area 39.

FIG. 3 is an extension of the flow diagram of FIG. 2. In particular, the exemplary user interface 41 is in the form of a timeline, including each of the data sequences VS, 25A, 25B depicted on the same timeline. This allows the user to readily determine what portion of each data sequence VS, 25A, 25B is utilized at any given time. The details of the user interface 41 will be discussed in greater detail below.

Methods

Figure 4:
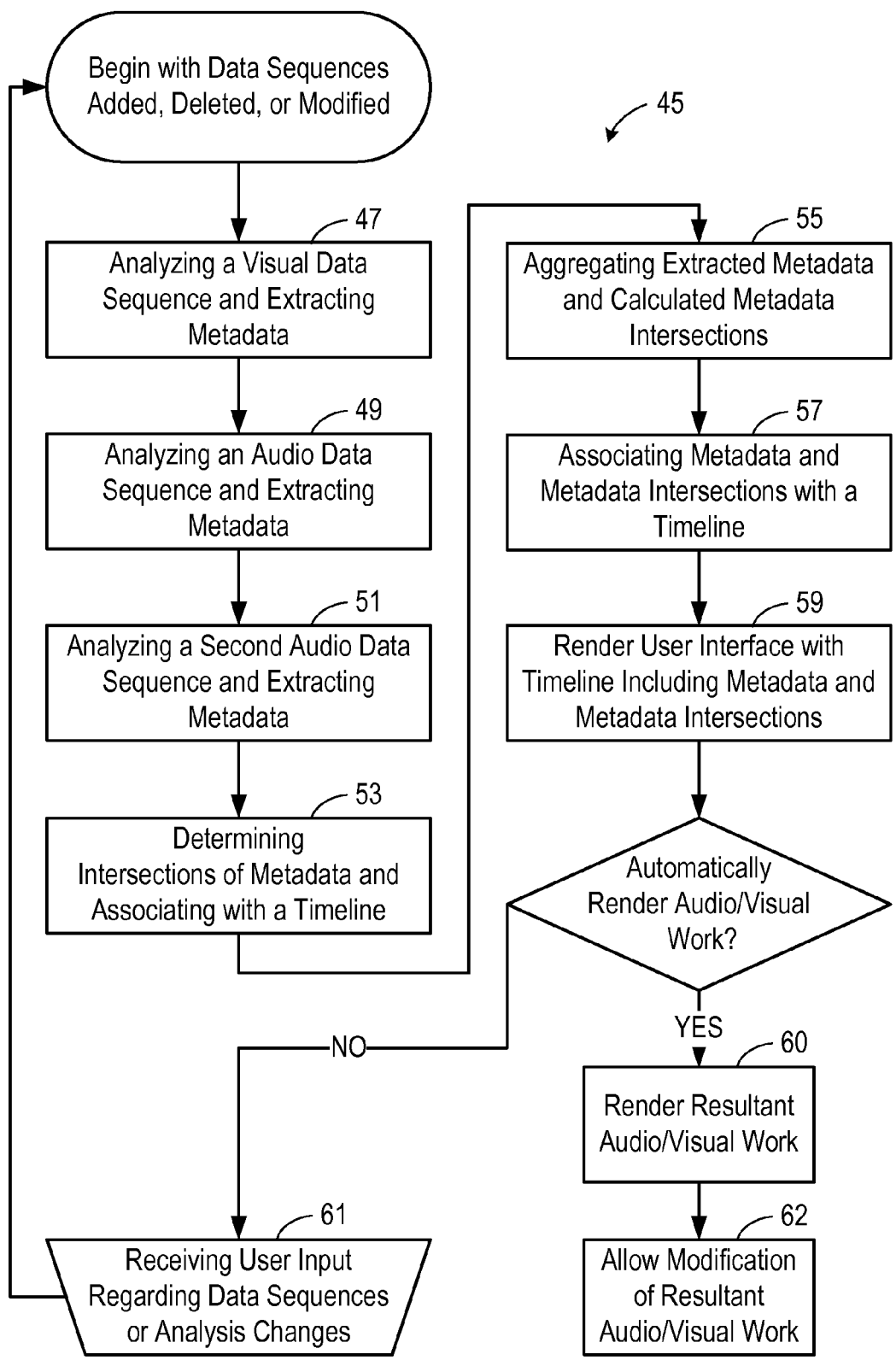
FIG. 4 is another flow diagram of a method of another embodiment of the invention.

A method for analyzing data sequences (such as data sequences VS, 25A, 25B introduced above) and extracting metadata associated with the data sequences for providing information related to events of the data sequences is generally indicated 45 in FIG. 4. The method comprises analyzing, at 47, a visual data sequence VS according to at least one characteristic of the visual data sequence and extracting, also at 47, metadata associated with the visual data sequence according to the at least one characteristic of the visual data sequence.

In one embodiment, the visual data sequence VS is analyzed, at 47, according to at least one visual characteristic. Moreover, the metadata associated with the visual data sequence VS is extracted according to the visual characteristic of the visual data sequence. In one alternative embodiment, visual characteristics of the video data sequence can comprise video dynamic peaks, dynamic image changes, color entropy characteristics, chroma values and patterns, luma values and patterns, and image pattern recognition, among others. In another alternative embodiment, video dynamic peaks can comprise detectable changes in the visual data sequence VS, such as scene changes (e.g., different scenes stored adjacent one another in the visual data sequence) and stark image transitions (e.g., large changes in brightness, large changes in color). Also, for example, dynamic image changes can comprise detectable changes in the visual data sequence VS (e.g., quick zooming, quick panning, removal of the lens cap, among others). Recognition of chroma values and patterns can detect the type of video, such as sports (e.g., baseball) or other known video pattern characteristics. In particular, the following patent application describes how to perform detection of the video type: U.S. patent application entitled Video Search and Services, filed Feb. 27, 2006, assigned to Microsoft Corporation of Redmond, Wash., U.S.A. In addition, the image pattern recognition visual characteristic can comprise recognition of particular images, such as people generally, a particular person, a particular face (i.e., face patterns), animals generally, a particular animal (e.g., a dog), and other items (e.g., a boat, a car, etc.) among others. In one embodiment, aspects of the invention may allow the user to select one or more images for pattern recognition analysis, such as from a drop-down menu. In other words, visual data sequence VS is analyzed, at 47, based upon its content to determine if metadata related to the content can be extracted, also at 47, such as where detectable changes in the data sequence occur. In particular, the following patent application describes how to perform face detection: U.S. patent application entitled Pose-Adaptive Face Detection System and Process, filed May 26, 2000, issued as U.S. Pat. No. 6,671,391, and assigned to Microsoft Corporation of Redmond, Wash., U.S.A. The following patent application describes how to perform face recognition: U.S. patent application entitled Pose-Invariant Face Recognition System and Process, filed Nov. 5, 2004, published as U.S. publication number US 2005-0147292 A1, and assigned to Microsoft Corporation of Redmond, Wash., U.S.A.

The method 45 further comprises analyzing, at 49, an audio data sequence 25A, substantially corresponding to the visual data sequence VS, according to at least one characteristic of the audio data sequence and extracting, also at 49, metadata associated with the audio data sequence according to at least one characteristic of the audio sequence data. Here, the audio data sequence 25A substantially corresponding to the visual data sequence VS may simply mean that the data sequences are related to one another. In one alternative embodiment, the typical audio recorded along with a video recording would be such an audio data sequence 25A substantially corresponding to the visual data sequence VS, or video recording.

In one embodiment, the audio data sequence 25A is analyzed, at 49, according to at least one audio characteristic. Moreover, the metadata associated with the audio data sequence 25A is extracted, at 49, according to the at least one audio characteristic of the audio data sequence. In one alternative embodiment, audio characteristics of the audio data sequence 25A can comprise music beats, audio dynamic peaks, speech characteristics, changes in the person speaking, recorded sounds, word boundary detection, and word and phrase detection (e.g., identify all occurrences of the phrase "Happy Birthday"), among others. In other words, the audio data sequence 25A can be analyzed according to any characteristic that can yield metadata regarding events of interest in the audio data sequence. In another alternative embodiment, the audio data sequence 25A can be analyzed to create a metadata event at significant music beats, or at all music beats. Identification of such events related to music beats can be useful to an editor, as the introduction of a new scene or new camera angle is often timed to coincide with the beat of background music. In another example, audio dynamic peaks, such as loud noises or other sharp increases and subsequent decreases in audio intensity, or volume, that are part of the audio data sequence can be identified as potential editing events. One skilled in the art would readily understand the other audio characteristics identified above. For example, the following patent application describes how to segment and classify an audio data sequence: U.S. patent application entitled Audio Segmentation and Classification, filed Apr. 19, 2000, issued as U.S. Pat. No. 6,901,362, and assigned to Microsoft Corporation of Redmond, Wash., U.S.A. For example, the following patent application describes how to determine if speaker identity has changed: U.S. patent application entitled Method of Real-time Speaker Change Point Detection, Speaker Tracking and Speaker Model Construction, filed Nov. 29, 2002, published as U.S. patent application number US 2004/0107100 A1, and assigned to Microsoft Corporation of Redmond, Wash., U.S.A.

The method 45 also comprises analyzing, at 51, a second audio data sequence 25B according to at least one characteristic of the second audio data sequence and extracting, also at 51, metadata associated with the second audio data sequence according to at least one characteristic of the second audio data sequence. Unlike the audio data sequence 25A discussed above, the second audio data sequence 25B does not necessarily substantially correspond to the visual data sequence VS. In one exemplary embodiment, where two microphones record two, separate audio tracks corresponding to the same video data sequence VS, both audio data sequences 25A, 25B will correspond to the video data sequence. In another alternative embodiment, the extracting, at 51, extracts metadata associated with a second audio data sequence 25B not in substantial correspondence with the visual data sequence VS.

For example, the extracting metadata, at 51, associated with the second audio data sequence 25B can comprise extracting metadata associated with an audio overlay, such as a musical piece (e.g., a song) or vocal narration.

In one embodiment, the second audio data sequence 25B is analyzed, at 51, according to at least one audio characteristic of the second audio data sequence. Moreover, the metadata associated with the second audio data sequence 25B is extracted, at 51, according to the at least one audio characteristic of the second audio data sequence. For example, audio characteristics of the second audio data sequence 25B can comprise music beats, audio dynamic peaks, speech characteristics, particular recorded sounds, word boundary detection, and word and phrase detection, among others, generally as discussed above with respect to the audio data sequence 25A.

The method 45 further determines, at 53, intersections of metadata from two or more of the extracted metadata occurring at substantially the same time. Determining intersections of metadata means reviewing the metadata extracted from each of the data sequences VS, 25A, 25B and determining if any of the metadata from one data sequence occurs at substantially the same time as metadata from another of the data sequences. Where metadata occur at substantially the same time, an intersection is determined. These intersections represent valuable events to the novice or experienced editor, as significant events have occurred at the same time on two or more data sequences. Noting these intersections of events for the user, as will be discussed in greater detail below, provides tangible, specific guidance to the user regarding effective editing strategies. For example, where a dynamic image change occurs in the visual data sequence VS at substantially the same time as an audio dynamic peak in the audio data sequence 25A, an intersection can be determined. In many cases, this metadata intersection event may be more useful that a solitary metadata event because the intersection event brings together features of interest from two or more data sequences, or parts of the final production. With the intersections determined, the method further aggregates, at 55, metadata and metadata intersections.

Once the intersections are determined, at 53, and the extracted metadata and metadata intersections are aggregated, at 55, with the timeline, the method 45 further comprises associating, at 57, metadata and metadata intersections with a timeline associated with the data sequences. This association, at 57, places each piece of extracted metadata and determined metadata intersection into a common timeline. This association with a common timeline provides for ready review of all the metadata and metadata intersections by the user of one or more of the metadata events, whereby further editing decisions are based upon the proximity, frequency, and density of the metadata associated with the timeline.

The method further comprises rendering, at 59, a user interface depicting the timeline with the data sequences VS, 25A, 25B, the metadata, and the intersections of metadata. The rendered user interface 41 (see FIG. 3) is a useful tool for editing, as it incorporates all of the extracted metadata and metadata intersections into a single interface for review by the user. The details of the user interface 41 will be discussed in greater detail below. In one example, the method may further comprise automatically rendering, at 60, a resultant audio/visual work. For example, without user direction, the method may utilize the previous analyzing and extracting 47, 49, 51, determining 53, aggregating 55, and associating 57 processes to render 60 a resultant audio-visual work automatically. Such an automatic rendering may be particularly useful for a user seeking a completed audio/visual work with relatively little effort and in as short a time period as possible. The method may further comprise allowing, at 62, the user to modify the resultant audio/visual work.

The method may further comprise receiving, at 61, user input regarding changes in one or more of the data sequences VS, 25A, 25B via the user interface 41. The user can elect to change any number of parameters, including moving, modifying, and deleting one or more of the data sequences VS, 25A, 25B. Moreover, the user can elect to add one or more additional data sequences. As would be understood by one skilled in the art, changes of this type will often change the location of metadata events and metadata intersections, requiring a new set of analysis, extractions, and determinations, generally as set forth above. For example, the user can decide to crop a particular portion of the visual data sequence VS and the associated portion of the audio data sequence 25A, thereby causing substantial changes in the location of metadata events. It should be readily appreciated here that even relatively minor changes to the data sequences VS, 25A, 25B can create significant changes to the extracted metadata and metadata intersections. Thus, after the user invokes such a change, the method repeats the analyzing and extracting 47, 49, 51 metadata associated with each of the data sequences, the determining 53, the aggregating 55, the associating 57, and the rendering 59 to ensure that the user interface 41 rendered is reflective of the location of metadata and metadata intersections created during the latest changes.

User Interface

As introduced above, a user interface 41 for integrating visual and audio data sequences VS, 25A, 25B together for creating an audio-visual work is depicted in FIG. 3. The user interface 41 includes a timeline, generally indicated 61, extending left to right and demarking the time for each of the data sequences on the timeline 61. As would be readily understood by one skilled in the art, the scale of the timeline 61 can be adjusted to suit the user, such as to focus in on a particular portion of interest, or to review a greater portion of the timeline 61 for a more general view. In the example depicted in FIG. 3, the timeline 61 extends from about 0 seconds to about 32 seconds. Any scale can be used without departing from the scope of the embodiments of the present invention.

The user interface 41 further comprises a visual timeline VT associated with the visual data sequence VS comprising one or more visual elements. The visual timeline VT depicts the beginning and the end of each of the one or more visual elements. In the example of FIG. 3, a first video segment VS1 extends from about zero seconds to about 22.5 seconds, while a second video segment VS2 extends from about 20.8 seconds and at least until the end of the visible visual timeline VT at about 32 seconds. Between about 20.8 seconds and about 22.5 seconds is a first transition T1 between the first video segment VS1 and the second video segment VS2.

Depiction of video segments VS1, VS2 and transitions T1 is well-known in the art. The visual timeline VT of the embodiments of the present invention, however, further include visual event markers, generally indicated 65, indicating the corresponding time on the timeline 61 of a particular visual event in the visual data sequence VS. The visual event markers 65 provide visual indications regarding events within the visual data sequence VS that are helpful to users when editing. Moreover, the visual event markers 65 further comprise at least one of an icon 67 indicative of the nature of the corresponding event and a value indicator 69 indicative of the relative value of the corresponding event.

The icons 67 corresponding to the visual event markers 65 can depict any class of events, or individual events. In one alternative embodiment, a new face icon, a face exit icon, and a new scene icon are included. Two of those, a new face icon 67A and a new scene icon 67B, are depicted in the example of FIG. 3. Thus, wherever a new face icon 67A appears, the editor knows that a new person has entered the scene, and wherever a new scene icon 67B appears, the editor knows that a new scene has begun. This is important information to the editor, which can now be used as a basis for other editing decisions. With conventional editing systems, the user would need to carefully review the visual data sequence VS manually to determine such editing events. The automatic extraction and rendering of these events on a user interface 41 provides this information to an editor directly. Visual demonstratives other than icons 67 are also contemplated as within the scope of the embodiments of the present invention (e.g., user-configurable thumbnails, including ones representative of the items detected, such as specific faces, boats, cars, etc.). Note that the exemplary user interface 41 of FIG. 3 may also include a tile (video) overlay visual demonstrative (not shown). Such demonstratives would be depicted similar to the visual demonstratives of the first video segment VS1.

The value indicators 69 depicted in the visual data sequence VS of FIG. 3 are vertical lines. Each of the value indicators 69 depicted in the visual data sequence VS of FIG. 3 are the same length, thickness, line-type, and color. By sharing the same length, thickness, line-type, and color, these value indicators 69 each correspond to a visual event marker 65 of similar value. The length, thickness, line-type, and color of the individual value indicators 69 can also be modified to indicate a value indicator of greater or lesser value, as compared with the other value indicators 69. For example, the line associated with a particular value indicator 69 can be lengthened to indicate its greater relative value. Similarly, a red value indicator 69 can indicate a higher value than a brown value indicator. In another example, the icon 67 can also indicate the value of the visual event marker 65 (e.g., a larger icon indicates greater relative value). Any such changes to indicate a greater or lesser relative value of a particular visual event marker 65 are contemplated as within the scope of the embodiments of the present invention.

The user interface 41 further comprises an audio timeline AT associated with an audio data sequence 25A comprising one or more audio elements. The audio timeline AT corresponds to the same time scale and position in time as the visual timeline VT. The audio timeline AT depicts an audio characteristic of the audio data sequence 25A, such as the output level of the audio data sequence over time. Like the visual timeline, the audio timeline AT depicts the beginning and the end of each of the one or more audio elements. In the example of FIG. 3, a first audio segment AS1 extends from about zero seconds to about 22.5 seconds, while a second audio segment AS2 extends from about 20.8 seconds and at least until the end of the visible audio timeline AT at about 32 seconds. As with the visual timeline VT, between about 20.8 seconds and about 22.5 seconds is the first transition T1 between the first audio segment AS1 and the second audio segment AS2.

Depiction of audio segments AS1, AS2 and transitions T1 is well known in the art. In addition, however, the audio timeline AT further includes audio event markers, generally indicated 71, indicating the corresponding time on the timeline 61 of a particular audio event in the audio data sequence 25A. The audio event markers 71 provide visual indications regarding events within the audio data sequence 25A that are helpful during editing. Moreover, the audio event markers 71 further comprise at least one of an icon 73 indicative of the nature of the corresponding event and a value indicator 75 indicative of the relative value of the corresponding event.

The icons 73 and value indicators 75 function similarly to those described above with respect to the visual data sequence VS. For example, an end of phrase icon, a beginning of phrase icon, an audio peak icon, a silence icon, a music beat icon, and a dynamic audio change icon are common examples. One of those, an end of phrase icon 73, is depicted in FIG. 3. Thus, wherever an end of phrase icon 67A appears, the editor knows that a person has stopped speaking, which can correspond to a convenient edit point.

The user interface 41 further comprises an overlay audio timeline OAT associated with an overlay audio data sequence 25B comprising one or more overlay audio elements. The overlay audio timeline OAT corresponds to the same time scale and position in time as the visual timeline VT and the audio timeline AT. The overlay audio timeline OAT depicts at least one audio characteristic of the overlay audio data sequence over time, such as the output level of the overlay audio data sequence 25B over time. In one alternative embodiment, the overlay audio data sequence 25B is a musical work, such as a song, which can be used in conjunction with the video data sequence VS and the audio data sequence 25A. In the example of FIG. 3, an audio segment AS extends from about zero seconds to about 32 seconds. Multiple audio segments AS can be utilized without departing from the scope of the embodiments of the present invention.

The overlay audio timeline OAT further includes overlay audio event markers, generally indicated 81, indicating the corresponding time on the timeline of a particular overlay audio event in the overlay audio data sequence 25B. The overlay audio event markers 81 provide visual indications regarding events within the overlay audio data sequence 25B, as did the event markers described above with respect to their data sequence. Moreover, the overlay audio event markers 81 further comprise at least one of an icon 83 indicative of the nature of the corresponding event and a value indicator 85 indicative of the relative value of the corresponding event. It should be noted here that each occurrence of an event marker 81, an icon 83, or a value indicator 85 is not marked with a reference numeral in FIG. 3. Several reference numerals were intentionally not included to decrease clutter in the view of the overlay audio timeline OAT.

The icons 83 and value indicators 85 function similarly to those described above with respect to the visual data sequence VS. For example, an end of phrase icon, a beginning of phrase icon, an audio peak icon, a silence icon, a music beat icon, and a dynamic audio change icon are common examples. Two of those, a music beat icon 83A and a dynamic audio change icon 83B, are depicted in FIG. 3. Thus, wherever a music beat icon 83A and/or a dynamic audio change icon 83B appears, the editor knows that the audio has changed significantly, which can correspond to a convenient edit point.

As discussed above, the user interface 41 includes value indicators 69, 75, 85 corresponding to each of the respective visual event markers 65, audio event markers 71, and overlay audio event markers 81. In one alternative embodiment, these value indicators 69, 75, 85 indicate increased value when two or more of the event markers 65, 71, 81 correspond to a substantially similar time on their respective timelines VT, AT, OAT. In the example depicted in FIG. 3, the majority of the value indicators 85 are relatively short and correspond to a single event marker 81 (e.g., a music beat, see icon 83A). Other value indicators 85A include lines that are relatively long and correspond to two event markers 81 occurring at a substantially similar time. In the example of FIG. 3, where a music beat icon 83A and a dynamic audio change icon 83B occur at a substantially similar time, the relative large value indicator 85A is utilized to increase the relative value of the event marker 81. Such an increase in value is appropriate because of the intersection of two event markers 83A, 83B at substantially the same time. As would be understood by one skilled in the art, the substantially similar time exhibited by two events need not be the exact same time. For example, by default, events no more than about five seconds apart can still be considered to have occurred at a substantially similar time. This number is readily configurable by the user, thereby allowing the user to customize the sensitivity of finding intersections and thereby the number of such intersections. Moreover, as would be understood by one skilled in the art, although the depicted example included an intersection of events on the same overlay audio timeline OAT, events on separate timelines (e.g., the visual timeline VT and the audio timeline AT) can also be determined as an intersection and given a higher value, as indicated above. Moreover, three or more event markers 65, 71, 81 occurring at a substantially similar time can indicate a value indicator of even greater value.

In another embodiment, at least one of the visual event markers 65, audio event markers 71, and overlay audio event markers 81 corresponds to a selection element 89 for selection by a user. The selection element 89 is adapted for selection of the event by a user and movement of the event to another time location on the respective timeline VT, AT, OAT by the user. In the example depicted in FIG. 3, the selection element 89 is a vertical guideline spanning each of the respective timelines VT, AT, OAT and indicating what event is invoked on each timeline at the same moment in time. By moving the event of interest (e.g., a video segment) along its respective timeline with the selection element 89, at least a portion of the data sequence (e.g., the visual data sequence VS) associated with the selection element also moves along the timeline. Moreover, at least one of the visual event markers 65, audio event markers 71, and overlay audio event markers 81 can be selected and snapped to the location of another of the event markers located on another of the timelines. In this manner, the various video segments VS and audio segments AS can be moved and snapped to appropriate locations whereby event markers 65, 71, 81 from different timelines are snapped into alignment with one another.

In this manner, the user can select a particular point to determine exactly which of the media from each data sequence VS, 25A, 25B will be shown at the particular time associated with the selection element 89. In another embodiment, this selection element 89 has further functions. For example, selection of the selection element 89 can increase the granularity of event markers 65, 71, 81 within the visual elements, the audio elements, and the overlay audio elements occurring at the selected time. In other words, increased granularity can be invoked over only a portion of the timeline including those elements associated with the time of the selection element 89.

In still another embodiment, a selection element 91 (e.g., a check box) for selecting the inclusion or exclusion of event markers 65, 71, 81 indicating particular types of events is included in the user interface 41. In one embodiment, such selection elements 91 for selecting the inclusion or exclusion of event markers 65, 71, 81 indicate particular types of events. In the example shown in FIG. 3, a new face selection element 91A, a new scene selection element 91B, an end-of-phrase selection element 91C, a music beat selection element 91D, and a dynamic audio change selection element 91E are depicted. By selecting and deselecting one or more of such selection elements 91, particular event markers 65, 71, 81 are included or excluded, respectively. For example, a user wishing to focus editing efforts only on new faces and music beat could select the new face selection element 91A and the music beat selection element 91D, while deselecting the remaining selection elements, such that only event markers 65, 71, 81 associated with new faces and music beat are shown. Other selection elements directed to event markers based upon other characteristics are also contemplated as within the scope of the embodiments of the present invention.

The selection elements 91 for selecting the inclusion or exclusion of event markers 65, 71, 81 can also each comprise a corresponding selection element (not shown) (e.g., a slider bar) adapted for adjusting the granularity of the inclusion or exclusion of the event markers associated with a particular selection element. For example, a granularity selection element associated with the new face selection element 91A can be adjusted to increase or decrease the frequency of new face events by increasing or decreasing the sensitivity of the analysis engine 37. Moreover, a selection element 93 for increasing or decreasing the granularity of the placement of all of the event markers 65, 71, 81 provides a mechanism for quickly increasing or decreasing the population of all events, depending upon the preference of the user.

The user interface 41 can be configured to provide functions even more specific than those discussed above. For example, a selection element can be included for automatically adjusting the viewing time of at least one of the digital images I to begin and end during the visual data sequence VS between audio beats of the overlay audio data sequence 25B. In another alternative embodiment, a selection element can be included for automatically adjusting the timeline position of at least one of the digital images I including the image of a particular item to appear substantially adjacent other video segments VS or digital images also including the image of the same item. Such a selection element can be useful in grouping similar items near one another in the timelines VT, AT, OAT. In one further alternative embodiment, the image of a particular item is the image of a person, whereby video segments and digital images of particular people can be automatically placed adjacent one another by selecting a single selection element.

In another embodiment, the user interface 41 further comprises an aggregate timeline (see FIG. 1) depicting the visual data sequence VS, the audio data sequence 25A, and the overlay audio data sequence 25B in a single, aggregate timeline.

System for Analyzing Data Sequences

Figure 5:
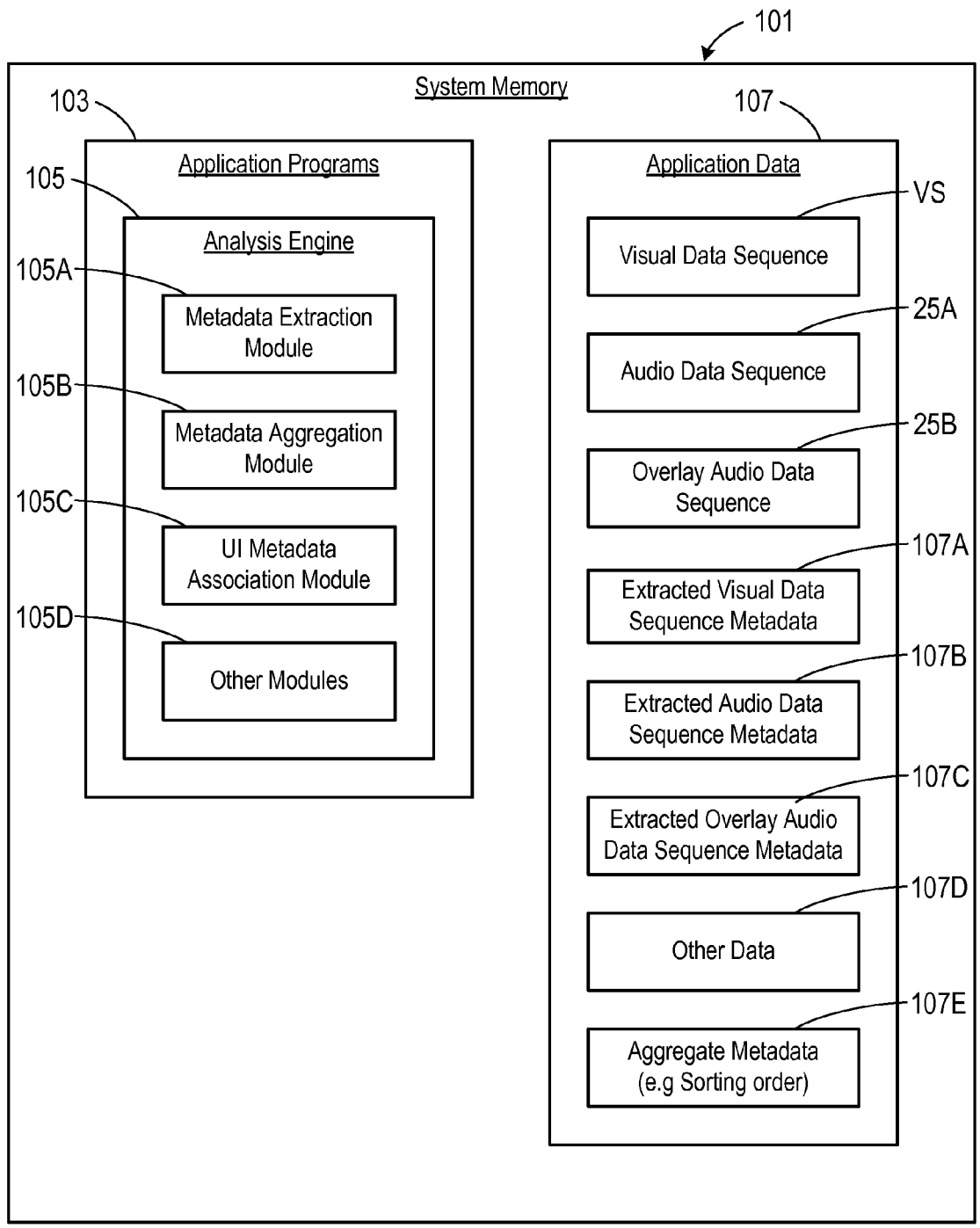
FIG. 5 is an exemplary system memory of another embodiment of the invention.

A system, generally indicated 101, for analyzing data sequences VS, 25A, 25B and extracting metadata associated with the data sequences for providing information related to events of the data sequences is depicted in FIG. 5. Broadly, the system 101 comprises application programs 103, including an analysis engine 105, and application data 107. The analysis engine 105 comprises a metadata extraction module 105A for extracting metadata associated with the data sequences VS, 25A, 25B, generally as set forth above. The analysis engine 105 further comprises a metadata aggregation module 105B for aggregating the extracted metadata from the data sequences VS, 25A, 25B.

The analysis engine 105 further comprises a user interface metadata association module 105C for providing information related to the aggregated metadata to a user via a user interface. Other modules 105D directed to other aspects of the embodiments of the present invention are also contemplated herein and depicted generally in FIG. 5.

The application data 107 comprises at least one visual data sequence VS, at least one audio data sequence 25A, and at least one second, or overlay, audio data sequence 25B, each stored as application data and generally as set forth above.

The application data 107 further comprises metadata associated with the visual data sequence 107A extracted by the metadata extraction module, metadata associated with the audio data sequence 107B extracted by the metadata extraction module, and metadata associated with the second, or overlay, audio data sequence 107C extracted by the metadata extraction module. The extracted metadata associated with the visual data sequence 107A comprises at least one of face patterns, color entropy characteristics, chroma values and patterns, luma values and patterns, among others. Each metadata element is associated with a timeline location corresponding to a timeline relating the data sequences to one another. The extracted metadata associated with the audio data sequence comprises at least one of pauses between phrases of an audio data sequence comprising speech, music, and recorded sounds, among others. In another embodiment, the application data further comprises other data 107D, such as a particular user-selected view, or other data. Moreover, the application data 107 comprises aggregated metadata 107E aggregated by the metadata aggregation module 105B. Beyond aggregated metadata, the aggregated metadata 107E may further comprise other related data, such as the sorting order for the resultant set of metadata. For example when sorting a spreadsheet application, one may select which rows or columns have precedence in sorting hierarchy and how the sorted hierarchy should be ordered. With the present example, the user may configure the sorting hierarchy of the event detection (e.g. determine and visualize a specific face detection over a generic face, and then determine how many faces are present in a scene, etc.).

Data Record

Figure 6:
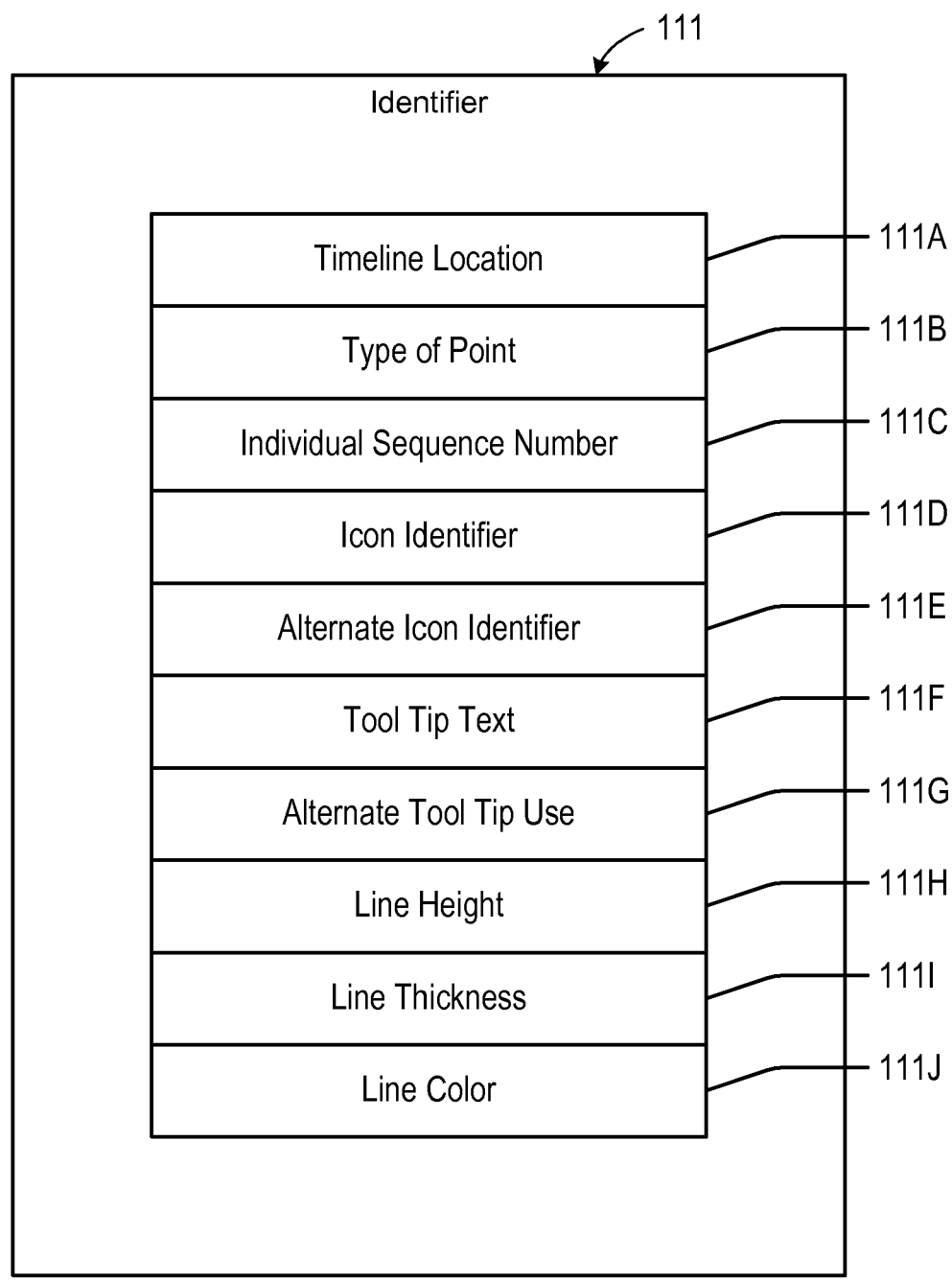
FIG. 6 is an exemplary data record of another embodiment of the invention.

Referring to FIG. 6, an exemplary data record, generally depicted 111, corresponding to an event marker 65, 71, 81 on a timeline VT, AT, OAT is depicted. Such a data record 111 would be generated for each event marker 65, 71, 81 associated with a particular data sequence VS, 25A, 25B. The exemplary data record 111 comprises a timeline location 111A of the event on the timeline VT, AT, OAT. This timeline location can be readily amended as the position of the event on the timeline changes, while maintaining the other information related to the event. The data record 111 further includes a type indicator 111B of the type of event indicated on the timeline. These data are useful in indicating the nature of the event, as discussed above. The data record 111 further comprises a sequence indicator 111C, or individual sequence number, indicating the location of the event relative to other events of the timeline VT, AT, OAT. The data record 111 further comprises an icon 111D indicative of the nature of the corresponding event and an alternate icon 111E indicative of the nature of the corresponding event. The alternate icon can provide the user with a choice of icons for a particular event, or serve as a substitute icon if the first icon is unavailable or otherwise unusable.

The data record 111 further comprises a data explaining the function of the data record 111F, such as for use with a tool tip text that appears when hovering a mouse cursor over an object (see FIG. 3). An alternate data 111G explaining the function of the data record is also included. The data record 111 further comprises a value indicator indicative of the relative value of the corresponding event. In the example shown, the value indicator is a line and the data record 111 further comprises a line height value 111H, a line thickness value 111I, and a line color value 111J, generally as set forth above.

General Purpose Computing Device

Figure 7:
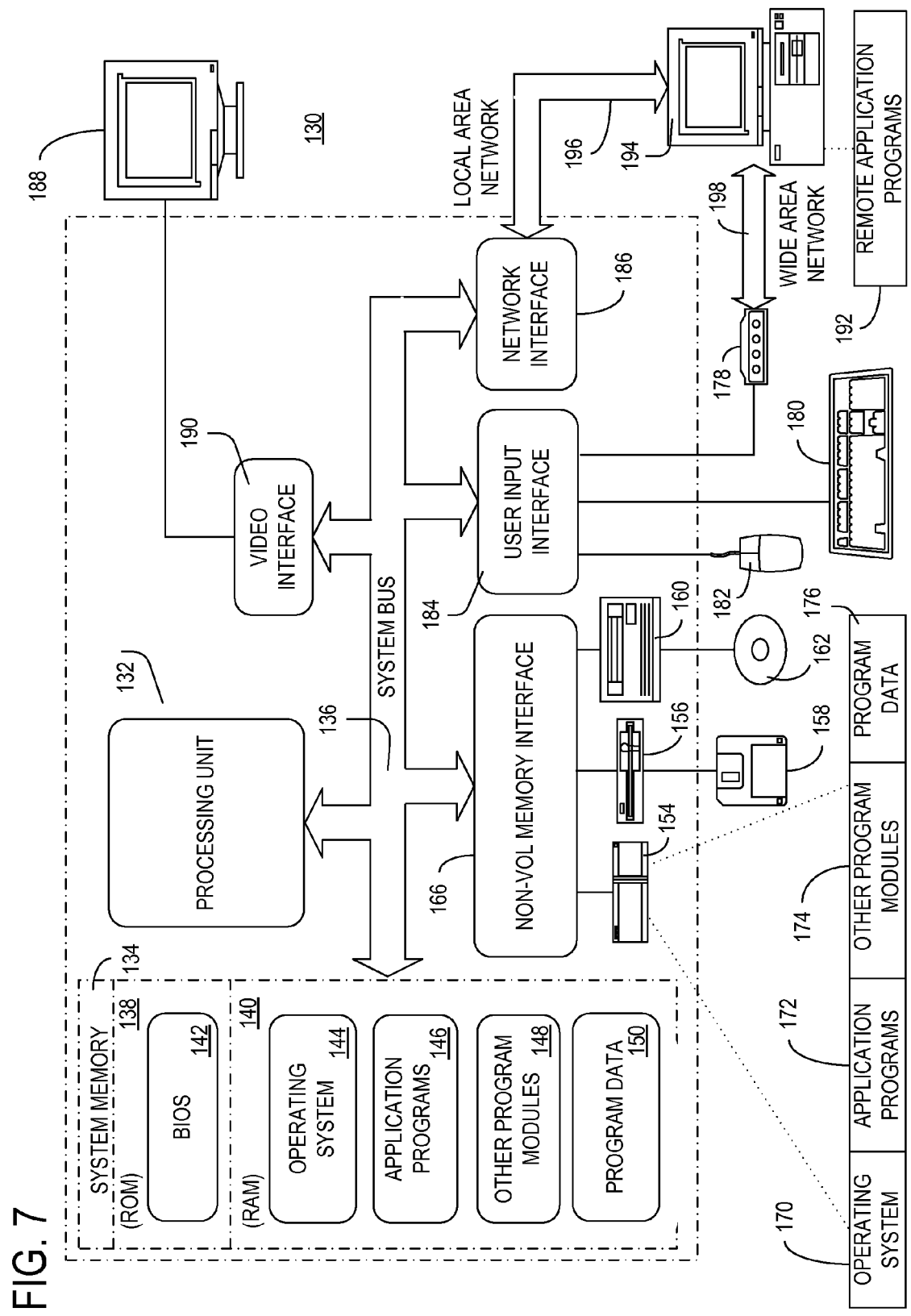
FIG. 7 is a block diagram illustrating one example of a suitable computing system environment in which one embodiment of the invention may be implemented.

FIG. 7 shows one example of a general purpose computing device in the form of a computer 130. In one embodiment of the invention, a computer such as the computer 130 is suitable for use in the other figures illustrated and described herein. Computer 130 additionally has one or more processors or processing units 132 and a system memory 134.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information. Communication media typically embody computer readable instructions, data structures, program modules, or other data in a modulated data signal such as a carrier wave or other transport mechanism and include any information delivery media.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130.

Although described in connection with an exemplary computing system environment, including computer 130, the embodiments of the invention are operational with numerous other general purpose or special purpose computing system environments or configurations. The computing system environment is not intended to suggest any limitation as to the scope of use or functionality of the embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of editing media objects based on events, said method comprising:
   analyzing a visual data sequence according to at least one characteristic of said visual data sequence;
   extracting metadata associated with said visual data sequence according to said at least one characteristic of said visual data sequence;
   analyzing an audio data sequence substantially corresponding to said visual data sequence according to at least one characteristic of said audio data sequence;
   extracting metadata associated with the audio data sequence according to at least one characteristic of said audio sequence data;
   determining intersections of metadata from two or more of said extracted metadata occurring at substantially the same time;
   aggregating the extracted metadata from said visual data sequence, said audio data sequence, and said determined intersections of metadata; and
   associating metadata and metadata intersections with a timeline associated with the data sequences.

2. A method as set forth in claim 1 further comprising analyzing a second audio data sequence according to at least one characteristic of said second audio data sequence;
   extracting metadata associated with the second audio data sequence according to at least one characteristic of said second audio data sequence;
   wherein said analyzing the visual data sequence according to the at least one characteristic of said visual data sequence comprises analyzing the visual data sequence according to at least one visual characteristic of said visual data sequence;
   wherein said extracting metadata associated with said visual data sequence according to said at least one characteristic of said visual data sequence comprises extracting metadata associated with said visual data sequence according to said at least one visual characteristic of said visual data sequence;
   wherein said analyzing the audio data sequence according to the at least one characteristic of said audio data sequence comprises analyzing the audio data sequence according to at least one audio characteristic of said audio data sequence;
   wherein said extracting metadata associated with the audio data sequence according to said at least one characteristic of said audio data sequence comprises extracting metadata associated with said audio data sequence according to said at least one audio characteristic of said audio data sequence;
   wherein said analyzing the second audio data sequence according to the at least one characteristic of said second audio data sequence comprises analyzing the second audio data sequence according to at least one audio characteristic of said second audio data sequence; and
   wherein said extracting metadata associated with the second audio data sequence according to at least one characteristic of said second audio data sequence comprises extracting metadata associated with the second audio data sequence according to said at least one audio characteristic of said second audio data sequence.

3. A method as set forth in claim 2 wherein said at least one audio characteristic of said audio data sequence comprises at least one of music beats, audio dynamic peaks, speech characteristics, selected recorded sounds, word boundary detection, and word and phrase detection; and
   wherein said at least one visual characteristic of said video data sequence comprises at least one of video dynamic peaks, dynamic image changes, and image pattern recognition.

4. A method as set forth in claim 1 further comprising rendering a user interface depicting a timeline with the data sequences, the metadata, and the intersections of metadata, receiving user input regarding changes in one or more of said data sequences via said user interface; and
   repeating said analyzing and extracting metadata associated with each of said data sequences, said aggregating, said determining, said associating, and said rendering.

5. A method as set forth in claim 1 further comprising performing the first analyzing, the first extracting, the second analyzing, the second extracting, the determining, the aggregating, and the associating automatically without user direction and rendering a resultant audio/visual work.

6. A method as set forth in claim 5 further comprising allowing the user to modify the resultant audio/visual work.

7. A system for editing media objects based on events, said system comprising:
   an analysis engine for analyzing a visual data sequence according to at least one characteristic of said visual data sequence and for analyzing an audio data sequence substantially corresponding to said visual data sequence according to at least one characteristic of said audio data sequence, said analysis engine further extracting metadata associated with said data sequences for providing information related to events of the data sequences, said analysis engine comprising,
   a metadata extraction module for extracting metadata associated with said visual data sequence according to said at least one characteristic of said visual data sequence and for extracting metadata associated with the audio data sequence according to at least one characteristic of said audio sequence data, wherein an intersection of metadata from two or more of said extracted metadata occurs at substantially the same time and wherein each metadata and the intersection of metadata is associated with a timeline location corresponding to a timeline relating the data sequences,
   a metadata aggregation module for aggregating the extracted metadata from the visual data sequence, the audio data sequence, and said intersection of metadata,
   a user interface metadata association module for providing information related to said aggregated metadata to a user via a user interface, and
   an analysis storage area for storing raw and extracted application data for analysis by the analysis engine, said raw application data comprising at least one visual data sequence stored as application data and at least one audio data sequence stored as application data, said extracted application data comprising metadata associated with said visual data sequence extracted by the metadata extraction module, metadata associated with said audio data sequence extracted by the metadata extraction module, and aggregated metadata aggregated by the metadata aggregation module.

8. A system as set forth in claim 7 wherein said extracted metadata associated with said visual data sequence comprises at least one of face patterns, color entropy characteristics, chroma values and patterns, and luma values and patterns, and wherein said extracted metadata associated with said audio data sequence comprises at least one of pauses between phrases of an audio data sequence comprising speech, music, and recorded sounds.

9. A system as set forth in claim 7 wherein said raw application data further comprises at least one second audio data sequence stored as application data, said extracted application data comprising metadata associated with said second audio data sequence extracted by the metadata extraction module.

* * * * *